358-69。 OR 3,206,546 SR

SEARCH ROOM

T 6532

INVENTOR.
ROGER D. THOMPSON
BY
W. A. Sponagle
ATTORNEY

Sept. 14, 1965 R. D. THOMPSON 3,206,546

APPARATUS FOR FABRICATING AN INDEXING ELEMENT FOR A COLOR IMAGE REPRODUCING DEVICE

Filed Sept. 7, 1961 5 Sheets-Sheet 2

INVENTOR.
ROGER D. THOMPSON
BY
[signature]
ATTORNEY

INVENTOR.
ROGER D. THOMPSON
BY
W. W. Sprouse
ATTORNEY

Sept. 14, 1965 R. D. THOMPSON 3,206,546

APPARATUS FOR FABRICATING AN INDEXING ELEMENT FOR A COLOR IMAGE REPRODUCING DEVICE

Filed Sept. 7, 1961 5 Sheets-Sheet 4

INVENTOR.
ROGER D. THOMPSON
BY
ATTORNEY

Sept. 14, 1965 R. D. THOMPSON 3,206,546

APPARATUS FOR FABRICATING AN INDEXING ELEMENT FOR A COLOR IMAGE REPRODUCING DEVICE

Filed Sept. 7, 1961 5 Sheets-Sheet 5

INVENTOR.
ROGER D. THOMPSON
BY
W. H. Sprowagle
ATTORNEY

United States Patent Office
3,206,546
Patented Sept. 14, 1965

3,206,546

APPARATUS FOR FABRICATING AN INDEXING ELEMENT FOR A COLOR IMAGE REPRODUCING DEVICE

Roger D. Thompson, Princeton, N.J., assignor to Radio Corporation of America, a corporation of Delaware Filed Sept. 7, 1961, Ser. No. 136,558
19 Claims. (Cl. 178—5.4)

This invention relates to the fabrication of an indexing element for a color image-reproducing device such as a cathode ray tube used in a color television receiver.

One way of operating a color image-reproducing device such as a cathode ray tube of the type where the color-producing phosphors are in vertical strips is to derive indexing information indicative of successive instantaneous positions of an electron beam as it is deflected transversely of the phosphor strips. Such a system is shown in Patent 2,545,325 granted March 13, 1951, to P. K. Weimer. Instead of deriving the indexing information directly from the screen-emitted light of a particular color, as in the Weimer patent, it frequently is desirable to obtain this information in the form of invisible radiation. In such cases it has been proposed to provide the image-producing tube with a screen structure for emitting such invisible radiation. In prior art apparatus, such screen structure is either in the form of separate strips bearing a known relationship and orientation relative to the color light-producing strips or in the form of invisible radiating phosphor material mixed with one of the light-producing phosphors.

One screen structure which has been used successfully in the prior art is one in which the color light-producing strips are deposited on the glass faceplate of the cathode ray tube. These phosphor strips are covered on the back side (i.e., remote from the faceplate) with a thin metallic layer such as aluminum. The indexing element which typically may be in the form of strips aligned with the color light-producing phosphor strips and capable of invisible (e.g. ultra-violet) radiation are then deposited on the rear surface of the metallic layer. In such case the ultra-violet radiation may be sensed by suitable apparatus located in back of the screen.

A preferred way of constructing a color light-producing phosphor strip screen is one using a photographic technique of exposing suitable materials to light through the faceplate of the cathode ray tube. When, however, such an array of color phosphor strips is then coated on its rear surface by a metallic layer, the same kind of photographic technique is not readily usable for the deposition of the ultra-violet radiation producing indexing structure.

It has been proposed in a copending patent application of John D. Bowker, Serial No. 111,949 filed May 23, 1961 (now Patent No. 3,164,744 issued January 5, 1965 and titled "Color Tube Beam Indexing With Ultra-Violet Rays"), to provide, on the back surface of the metallic layer, a continuous layer of material capable of emitting ultra-violet or other invisible radiation. The invisible radiation produced by an electron beam impinging upon such a structure is focused by a suitable optical system upon an indexing element which is capable of passing such radiation to a sensing device responsive to it. The indexing element is of a character to selectively transmit to the sensing device only that invisible radiation emanating from selected points on the surface of the layer of material capable of emitting such invisible radiation. In this way, indexing signals are produced for use in operating the color image-reproducing system employing a cathode ray tube of the character described.

It is an object of the present invention to provide apparatus for fabricating an indexing element for use in a system of the character described.

Another object of the invention is to provide apparatus using light derived from the color light-producing phosphor strips of the cathode ray tube with which the indexing element is to be used for fabricating such an indexing element.

In accordance with the present invention, there is provided apparatus for fabricating an indexing element from a structure which is susceptible of modification by energy derived from screen-scanning means such as an electron beam such that, after modification, it will transform such energy into the desired indexing information. In an illustrative case, an unexposed photographic element such as a plate or film sensitive to the invisible radiation is used. The intensity of the electron beam is modified in a desired manner as the beam is deflected over the screen structure so as to correspondingly vary the intensity of the invisible radiation directed to the photographic element. The photographic element, thus, is exposed in varying degrees according to a predetermined pattern. When such a photographic element is further processed, the finished indexing element is a transparency capable of transmitting to a sensing device invisible radiation which varies in intensity in accordance with the predetermined pattern, thereby producing the desired indexing information.

More particularly the apparatus, in accordance with this invention, for producing such an indexing element includes means which is responsive only to light of a particular color derived from the front of the cathode ray tube to produce signals which are indicative of successive instantaneous positions of the electron beam as it is deflected over the luminescent screen. These signals, after suitable processing, are used to control the intensity of the electron beam as a function of the instantaneous beam positions.

The signals derived from light of the particular color are (1) divided in frequency, (2) processed by a gamma amplifier to compensate for the non-linear signal-to-light transfer characteristic of the cathode ray tube, (3) modified by a shading modulator to compensate for intensity variations of the invisible radiation reaching the indexing element from different areas of the screen, and (4) then are applied to the beam intensity control electrode structure of the cathode ray tube.

The illustratively disclosed deflection of the electron beam over the face of the cathode ray tube is of a character to produce alternate beam traces and retraces spaced longitudinally of the color phosphor strips with both traces and retraces being effected at substantially the same rate. During a portion of each trace and retrace, the electron beam is blanked and remains in this condition until it nears the center of the screen. At this time, the beam is unblanked and the frequency divider is triggered into operation and, until such time that its operation is stabilized, the electron beam intensity is gradually increased to such a point that signals are produced which are capable of operating the fabricating apparatus as desired. During the remaining portion of each beam trace and retrace, the intensity of the beam is modulated according to a prearranged plan to compensate for the described intensity variations of the invisible radiation.

For a better understanding of the apparatus for fabricating an indexing element according to the present invention, reference is made to the following description which is taken in conjunction with the accompanying drawings, of which:

Figures 1, 2, 3:
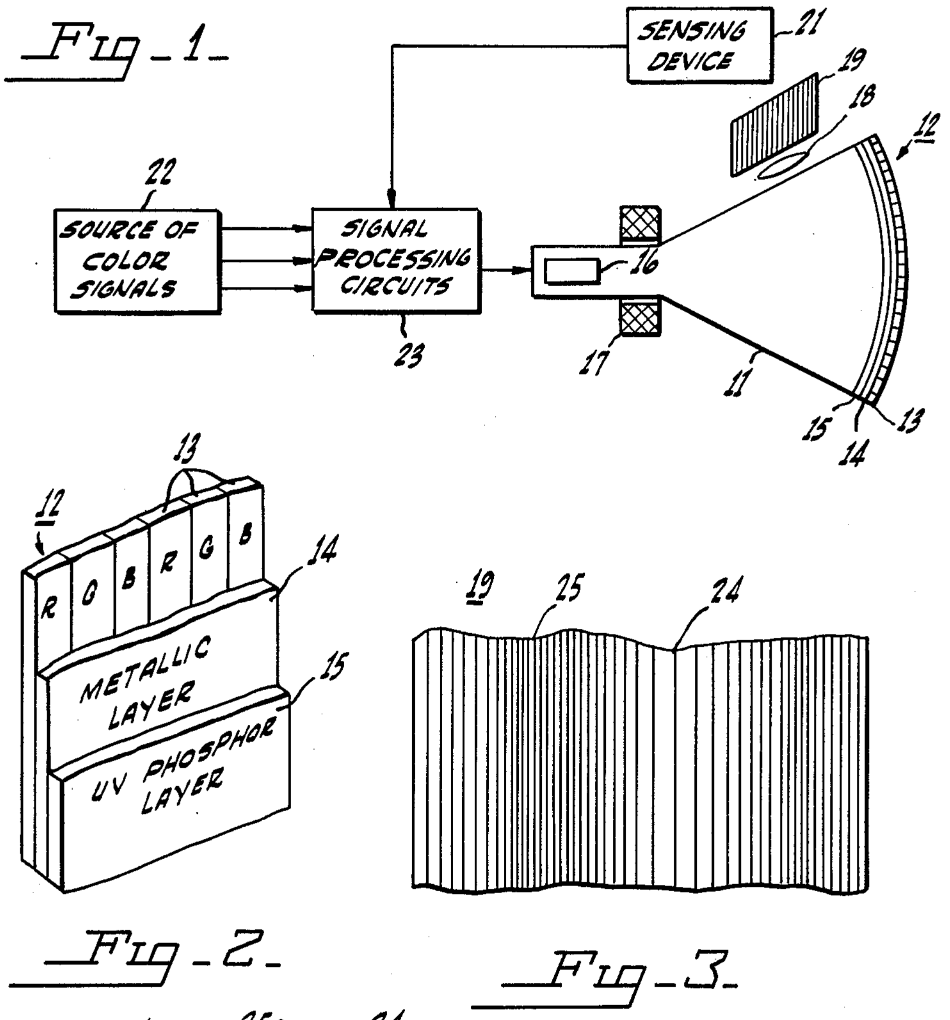
FIGURE 1 shows one general type of system in which such an indexing element may be used.
FIGURE 2 is a fragmentary and enlarged representation of the screen of a cathode ray tube used in FIGURE 1.
FIGURE 3 is a fragmentary representation of one form of indexing element used in the system of FIGURE 1 and which may be fabricated by the apparatus provided in accordance with the instant invention.
Figure 3A:
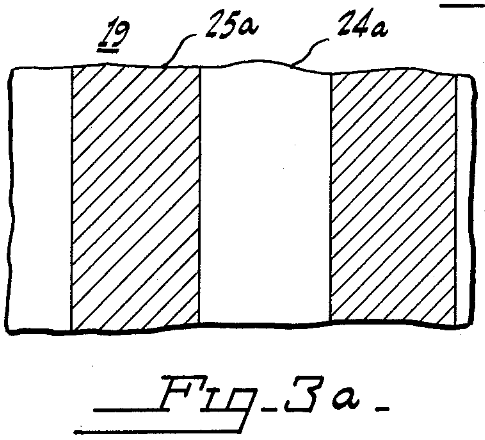
Figure 5:
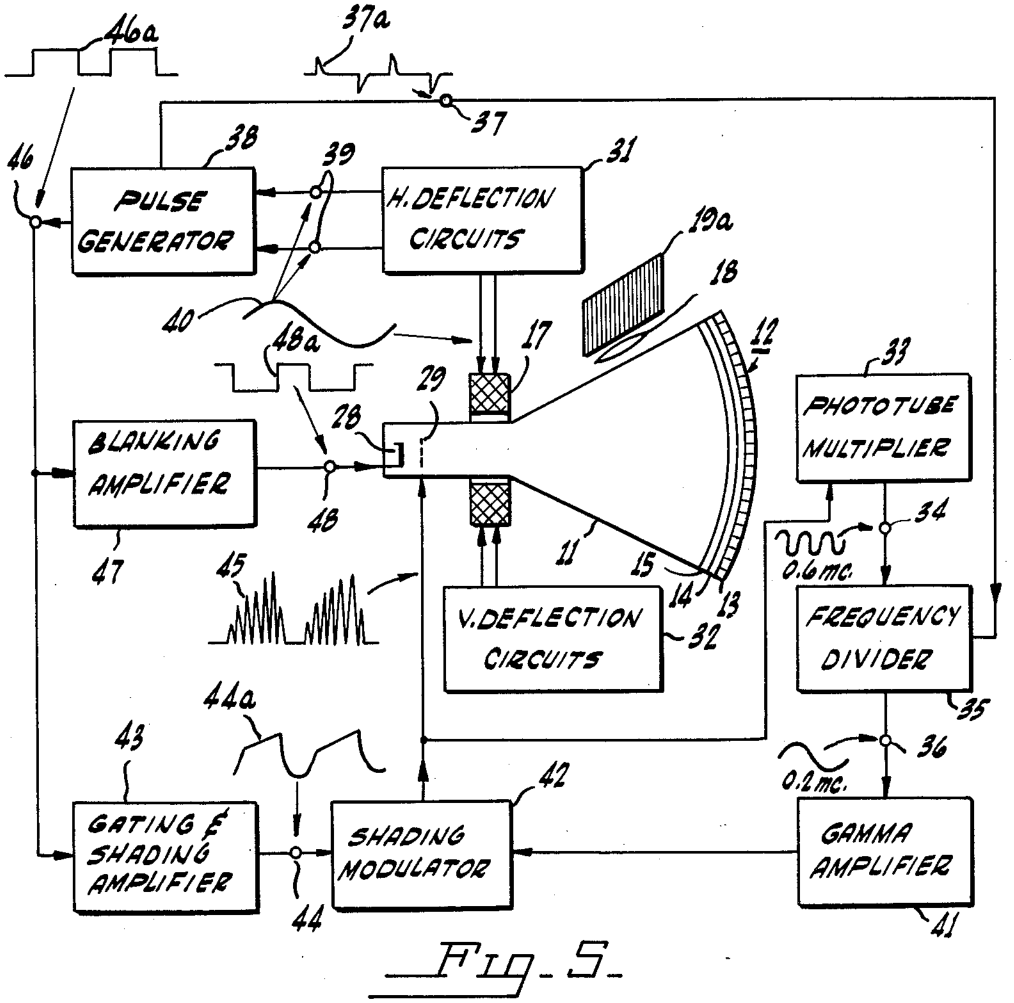
Figure 4:
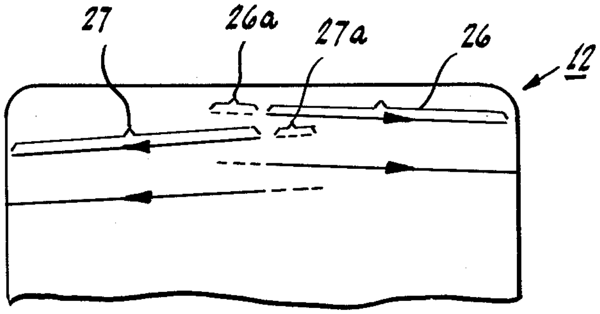
Figure 6:
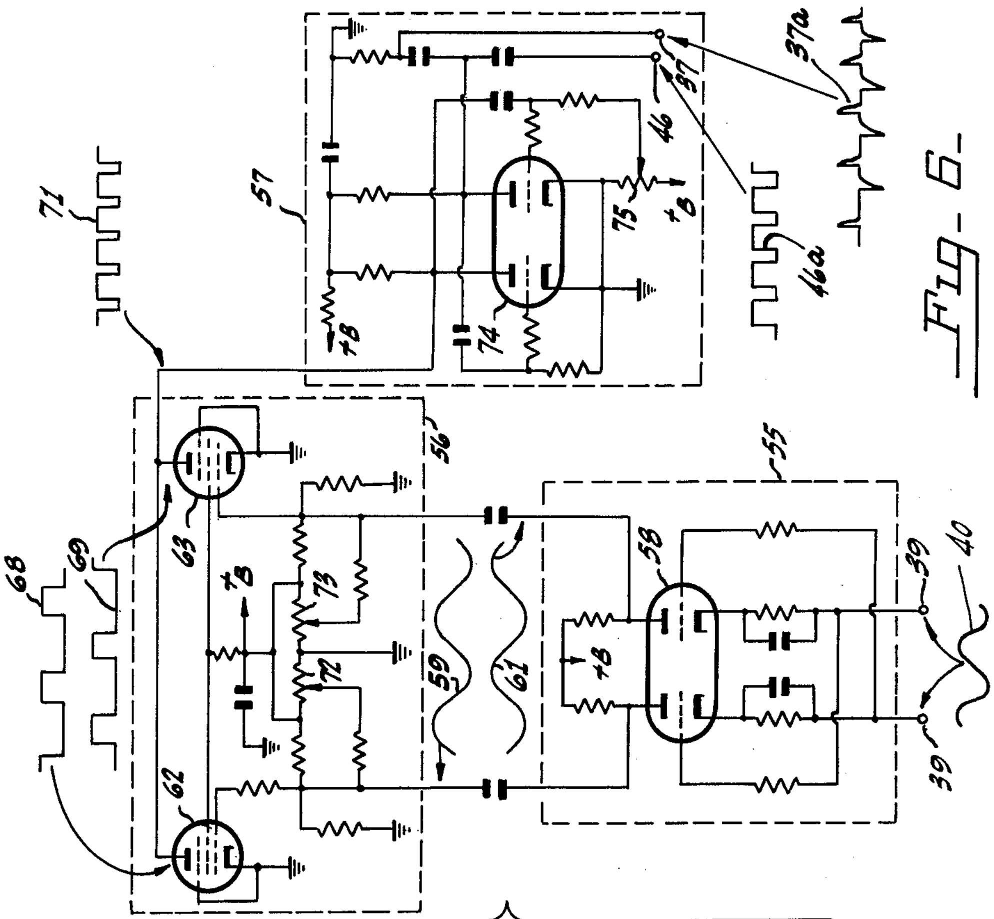
Figure 7:
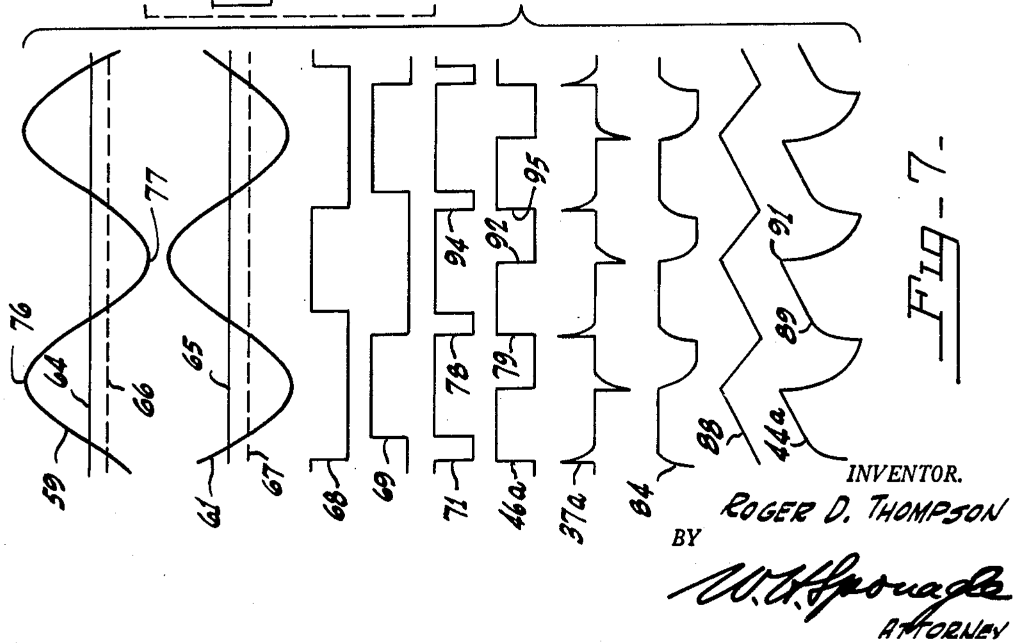
Figures 8, 10:
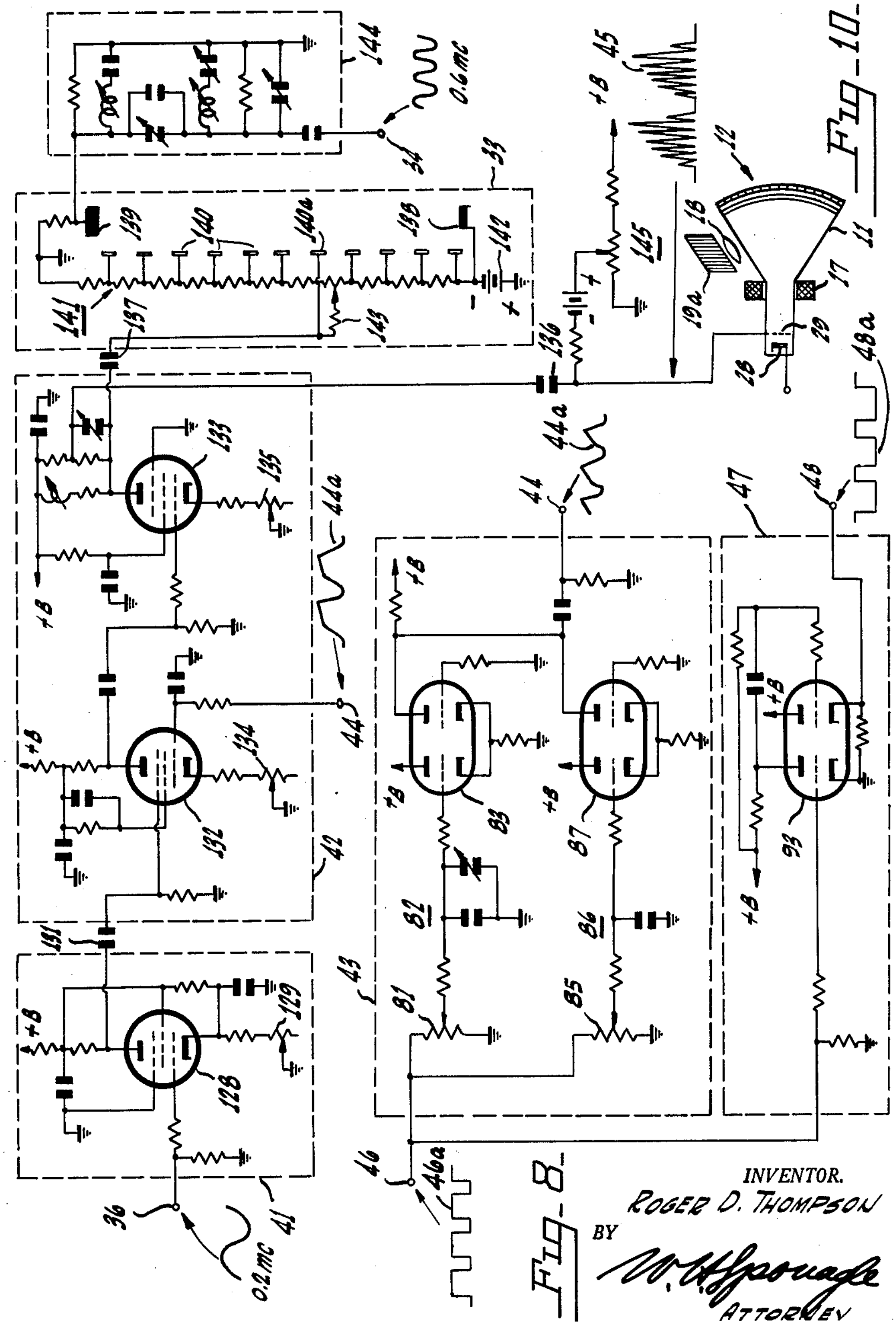
Figure 9:
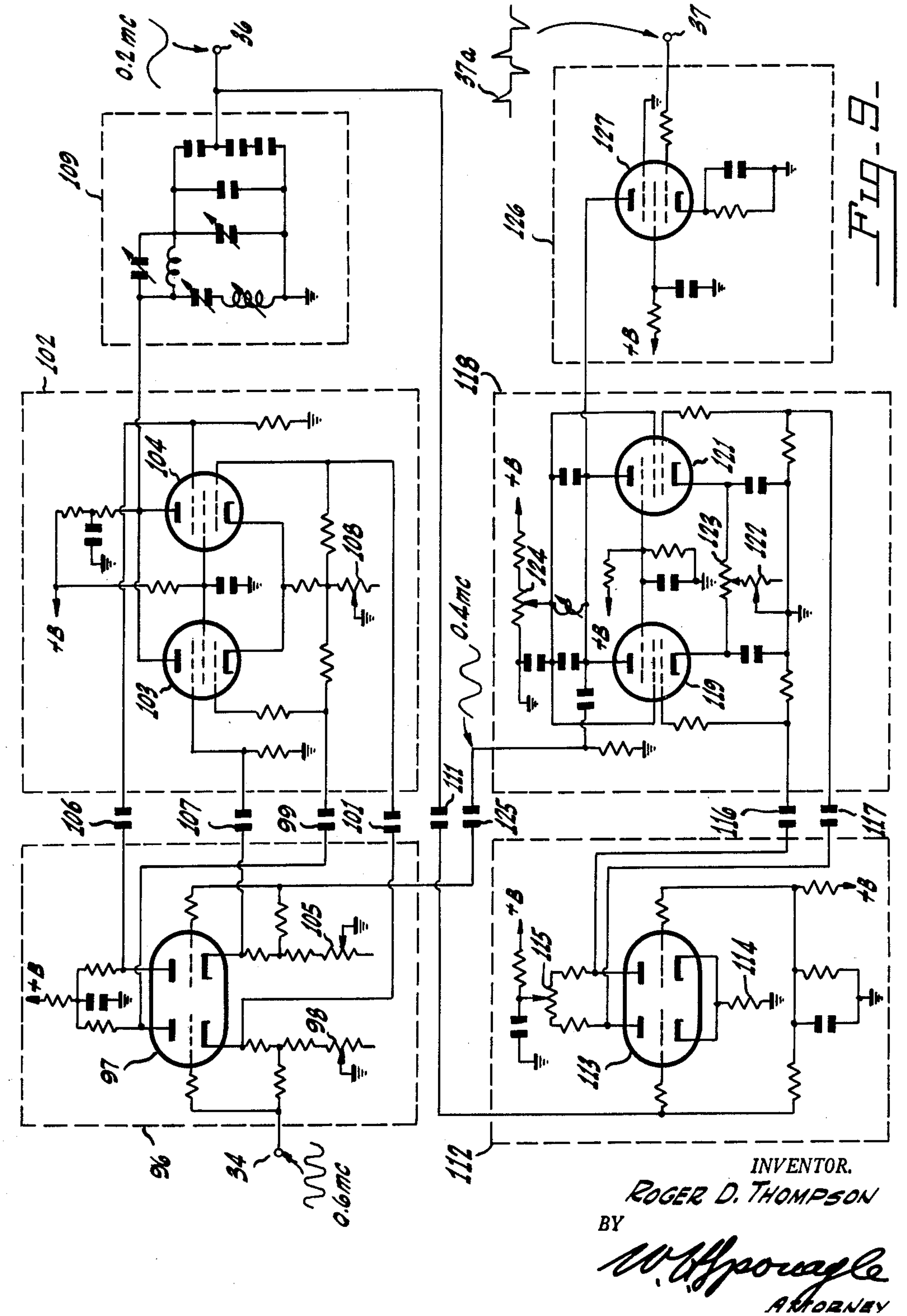

FIGURE 3*a* is a fragmentary representation of another form of indexing element which may be made by the apparatus of this invention;

FIGURE 4 is a view of the screen of the cathode ray tube of FIGURE 1 showing typical traces and retraces of the electron beam as it is deflected over the screen in the operation of apparatus embodying the invention;

FIGURE 5 is a block diagram of typical apparatus in accordance with this invention for fabricating an indexing element suitable for use in the system of FIGURE 1;

FIGURE 6 is a schematic circuit diagram of a typical pulse generator used in the system of FIGURE 5;

FIGURE 7 is a series of curves which will be referred to in the description of the operation of the apparatus of FIGURE 5;

FIGURE 8 shows schematic circuit diagrams respectively of a typical blanking amplifier and a typical gating and shading amplifier used in the system of FIGURE 5;

FIGURE 9 is a schematic circuit diagram of a typical frequency divider used in the system of FIGURE 5; and FIGURE 10 shows schematic circuit diagrams respectively of a typical gamma amplifier, a typical shading modulator, a typical phototube multiplier and auxiliary apparatus, and a typical brightness control for the cathode ray tube used in the system of FIGURE 5.

In order better to understand the apparatus embodying the present invention reference first will be made to FIGURE 1 for a brief description of a color television image-reproducing system in which a sensing element made by the apparatus of this invention is used. Such a system is of the type disclosed in the copending Bowker patent previously referred to. A color kinescope 11 of the vertical line screen type has a luminescent screen 12 comprising a plurality of color light-producing phosphors 13 located on the inner surface of the faceplate. These phosphors are in vertical strips and are backed by a metallic layer 14 such as aluminum for example. On the back of the metallic layer is a continuous layer 15 of invisible radiation-producing material. The color kinescope also has an electron gun 16 to produce an electron beam which is deflected over the screen 12 by a deflection yoke 17 so as to scan a raster of substantially horizontal lines. As the beam is deflected over the screen it not only produces light of different colors by impingement of the phosphor strips 13 in response to suitable intensity modulation by video signals, but also produces indexing information from the layer 15 in the form of short persistence (e.g. invisible) radiation such as ultra-violet rays for example.

The ultra-violet (UV) radiation is directed by an optical system 18 to points on an indexing element 19 in correspondence with the points of the layer 15 at which the radiation originates. The indexing element 19 is a variable density transparency (to be more fully described subsequently) such that the UV radiation is transmitted to a sensing device 21 by which to produce the desired indexing signals. The sensing device typically may be a phototube multiplier which is responsive to UV radiation either inherently or by means of a UV-passing filter located in front of the photocathode.

There also is provided a source 22 of color signals typically representative of the red, green and blue component colors of the image to be reproduced. These signals are impressed upon signal-processing circuits 23 which are controlled by the indexing signals derived from the sensing device 21. The output from the signal-processing circuits is impressed on the electron gun 16 so as to modulate the intensity of the electron beam in accordance with the component color signals.

A portion of the luminescent screen 12 of the cathode ray tube 11 of FIGURE 1 is shown in greater detail in FIGURE 2. The color phosphor strips 13 are arranged in repeating groups of three, each group including red, green and blue light-producing phosphors R, G and B respectively. The metallic layer 14 covers the back surfaces of the color phosphor strips 13. This metallic layer in turn is backed by the invisible radiation producing layer 15 which is a layer of UV-producing phosphor material.

FIGURE 3 illustrates one form of the variable density UV-transmitting indexing element 19 of FIGURE 1. The transmission capability of the indexing element varies from a maximum in the region 24 to a minimum in the region 25. In a particular form of such an element, the variation between maximum and minimum transmission capability is in accordance with a sinusoidal function with one cycle of the variation corresponding to three groups of the phosphor strips 13 of FIGURES 1 and 2. By such an arrangement, one cycle of the indexing signals corresponds to three complete color cycles as the electron beam is deflected transversely of the color phosphor strips. Other relationships between the indexing signal frequency and the repetition rate of the color phosphor groups may be employed in such a system. For example, a 1-to-1, a 2-to-3 or a 4-to-3 relationship of indexing signal-to-color group repetition may be used.

Also, as shown in FIGURE 3*a*, the variation of UV-transmission capability of the indexing element 19 may vary according to functions other than a sinusoidal function. For example, such an element may have sharply defined alternate zones **24*a* and 25*a***, respectively, of maximum and minimum UV-transmission capability. In such a case, the relationship between pairs of maximum and minimum transmission zones and the color phosphor groups may be anything desired such as 1-to-3, 1-to-1, 2-to-3, 4-to-3, etc.

Before describing the apparatus by which the indexing element is fabricated in accordance with the present invention, the manner in which the electron beam is deflected over the screen of the cathode ray tube will be described with reference to FIGURE 4. Also, in connection with this figure, a general description of the intensity modulation of the electron beam will be given. In this way, a better understanding of the fabricating apparatus and its operation will be afforded. FIGURE 4 represents part of the luminescent screen 12 of the color kinescope 11. The electron beam is deflected over the luminescent screen 12 in alternate traces 26 etc., and retraces 27 etc., in the directions indicated by the arrows. None of these traces and retraces is visible completely across the screen. The trace component **26*a*, for example, begins at the left of the center of the screen. It is to be understood that the absence of any trace or retrace representative line in this figure indicates that the intensity of the electron beam is less than that required to produce visible light on the screen. In other words, the beam is effectively blanked during such intervals. During the period represented by the trace component 26*a* the beam is unblanked but is at less than maximum intensity. During this period the beam is gradually increased in intensity until it reaches a nominal maximum intensity at or just before the beam reaches the center of the screen. During the period represented by the trace component 26 the beam has the nominal maximum intensity. During the deflection of the beam represented by the trace component 26** its intensity is varied about the maximum nominal value in accordance with the desired pattern which is to be imparted to the indexing element.

Upon reaching the right hand edge of the screen 12 the electron beam is blanked and the deflection direction is reversed. The beam remains blanked until it approaches the center of the screen. The retrace component **27*a*** indicates that at this point the beam is unblanked and its intensity is gradually increased to the nominal maximum value as it reaches the center of the screen. During the period represented by the retrace component 27 the beam continues until it reaches the left hand edge of the screen during which period its intensity is modulated according to the desired function similarly to that described with reference to the trace component 26.

The alternate trace and retrace reflections of the electron beam is continued progressively downward over the screen until the entire area is covered. The deflection of the electron beam during the fabrication of the indexing element may be effected in accordance with any desired function and at any desired rate, neither of which need bear any relationship to the conventional deflection of the beam for the reproduction of a color television image. In the particular apparatus illustratively disclosed, the beam deflection is effected at about 1/10 of the conventional deflection rates of 15,750 cycles per second horizontally and 60 cycles per second vertically. Horizontal deflection is in accordance with a sinusoidal function. Also, the beam preferably is focused so that the screen area covered by it is of suitable size to insure complete coverage of the entire screen area even though the beam is blanked during a substantial portion of each deflection cycle as previously described.

FIGURE 5 shows, in block diagram form, typical apparatus according to the present invention for fabricating an indexing element such as that shown and described with reference to FIGURE 1. The indexing element structure **19*a* which is to be processed to have the form of the indexing element 19 of FIGURE 3 is initially an unexposed photographic plate or film. The electron beam produced by a gun including a cathode 28 and an intensity control grid 29 is deflected by the yoke 17 under the control of horizontal and vertical deflection circuits 31 and 32 respectively to scan a raster at the screen 12. In the illustratively disclosed embodiment of the invention, the deflection of the electron beam, at least horizontally, is produced by suitable energization of the horizontal windings of the yoke 17 by currents derived from the horizontal deflection circuits 31 which vary as a sinusoidal function rather than as the usual sawtooth function. Light from only one of the color light-producing phosphors 13, such as blue light, for example, is directed to a phototube multiplier 33 which is made sensitive to the blue light either inherently or by a suitable blue light-passing filter. The impulses produced by the blue light responsive phototube multiplier are converted by suitable known means (not shown) to a sinusoidal wave having a frequency determined by the number of blue phosphor strips included in the screen 12 and the rate at which the electron beam traverses these strips. In the illustrative embodiment of the invention disclosed, the frequency of the sinusoidal wave derived from the phototube multiplier 33 and appearing at terminal 34 is 0.6 megacycle per second (mc.). Also, the apparatus operates to produce the indexing element 19 of FIGURE 3 in which there is a sinusoidal variation in the UV radiation-passing capability and this variation occurs at a frequency which is 1/3 of the rate at which the groups of color phosphors 13 are excited by the electron beam in the operation of the color kinescope for the production of a color image. It, therefore, is necessary in this case to modulate the intensity of the electron beam at a frequency which is 1/3 of the frequency of the sinusoidal wave appearing at terminal 34**.

This 0.6 mc. wave at terminal 34 is impressed upon a frequency divider 35 so as to produce at terminal 36 a sinusoidal wave having a frequency of 0.2 mc. The frequency divider is of the so-called regenerative type, details of which subsequently will be described. After each period of inactivity, such as occurs between alternate traces and retraces of the electron beam over the luminescent screen 12 of the color kinescope 11 as described with reference to FIGURE 4, such a frequency divider requires a short period in which to reach a stable operating state. Accordingly, at the beginning of the trace and retrace components **26*a* and 27*a* of FIGURE 4, the frequency divider is triggered into operation by means of triggering pulses 37*a* developed at terminal 37. The frequency divider triggering must be so timed that the 0.2 mc. wave produced at terminal 36 invariably has a given phase relationship to the 0.6 mc. wave at terminal 34 and, hence, to the groups of color phosphor strips of the luminescent screen 12. Properly timed triggering pulses 37*a* are derived from a pulse generator 38 which is connected at terminals 39 to the horizontal deflection circuits 31 and is responsive to a given amplitude of the sinusoidal deflection current wave 40 provided by these circuits to the deflection yoke 17 and also to terminals 39**.

For the fabrication of an indexing element to produce a 1-to-1 relationship of indexing signal-to-color group repetition, the frequency divider 35 and its control facilities would be omitted.

The 0.2 mc. sinusoidal wave derived from the frequency divider 35 and appearing at terminal 36 is impressed upon a gamma amplifier 41 which modifies the form of wave suitably to compensate for the non-linear signal-to-light transfer characteristic of the color kinescope 11 so as to insure that the light output from the luminescent screen 12 of the cathode ray tube 11 has the desired substantially sinusoidal variation in intensity corresponding to the 0.2 mc. sinusoidal wave. The gamma-corrected wave derived from the gamma amplifier is impressed upon a shading modulator 42 which is connected to a gating and shading amplifier 43 at terminal 44. A modulating signal wave **44*a*, derived from the gating and shading amplifier 43 and appearing at terminal 44 is employed by the shading modulator 42 to amplitude modulate the gamma-corrected sinusoidal wave to produce a beam-controlling wave such as the video signal wave 45. The video signal wave is impressed upon the intensity control grid 29 of the color kinescope 11** for varying the intensity of the electron beam to produce the light effects described with reference to FIGURE 4.

The pulse generator 38 produces a series of control pulses **46*a* at terminal 46. The gating and shading amplifier 43 is connected to the terminal 46 to receive these control pulses and is suitably controlled thereby to provide the desired modulating signal wave 44*a* at terminal 44**.

A blanking amplifier 47 also is connected to terminal 46 to receive the control pulses **46*a* and is connected at terminal 48 to the cathode 28 of the color kinescope 11. The blanking amplifier functions in response to the control pulses to so bias the cathode 28 of the color kinescope 11 by blanking pulses 48*a* that, during the periods between visible traces and retraces on the luminescent screen 12**, the electron beam is blanked as previously described with reference to FIGURE 4.

The operation of the apparatus shown in FIGURE 5 now will be described with reference also to FIGURE 4. The sinusoidal current wave 40 derived from the horizontal deflection circuits 31 is applied to the deflection yoke 17, thereby to deflect the electron beam in such a manner as to scan the luminescent screen 12 alternately from left-to-right and from right-to-left, each scansion being effected in substantially the same time as illustratively disclosed. As previously described with reference to FIGURE 4, during the initial portion of the first line scansion the beam is blanked under the control of the blanking pulses **48*a* derived from the blanking amplifier 47. The pulse generator 38, in response to the sinusoidal deflection current wave 40 produces a pulse 46*a*, the leading edge of which occurs at a time corresponding to that indicated by the left hand end of the trace component 26*a* of FIGURE 4. In response to this pulse the blanking amplifier 47 functions to terminate one of the blanking pulses 48*a*, thereby unblanking the electron beam of the color kinescope 11**.

The triggering pulses 37$a$ at terminal 37 occur in substantial time coincidence with the positive-going edges of the control pulses 46$a$ and with the negative-going edges of the blanking pulses 48$a$. The application of the triggering pulses to the frequency divider 35 triggers it into operation at a time corresponding substantially with that indicated by the left hand end of the trace component 26$a$ of FIGURE 4.

The application of the pulses 46$a$ developed at terminal 46 to the gating and shading amplifier 43 actuates this amplifier to produce the modulating signal wave 44$a$ at terminal 44. The signal 44$a$ begins to increase in amplitude at a time corresponding to that indicated by the left hand end of the trace component 26$a$ of FIGURE 4. During the initial period of the amplitude increase of the signal 44$a$, the rate of increase varies until there is reached a point in time corresponding to that indicated by the left hand end of the trace component 26 of FIGURE 4. As previously described, the beam is then at approximately the center of the luminescent screen 12 of the color kinescope 11. From this point in time the increase in amplitude of the signal 44$a$ is at a substantially constant rate until such time as the electron beam is deflected to the right hand side of the luminescent screen. At such time, the negative-going edge of the control pulse 46$a$ operates the gating and shading amplifier 43 to rapidly decrease the amplitude of the modulating signal 44$a$.

The video signal wave 45 undergoes amplitude changes corresponding to those of the modulating signal wave 44$a$ so as to similarly vary the electron beam intensity during each trace 26$a$, 26 and each retrace 27$a$, 27 of FIGURE 4. During the period of each trace component 26$a$ and each retrace component 27$a$, the electron beam is gradually increased in intensity, thereby providing an output from the phototube mutiplier 33 by which to enable the frequency divider 35 to begin operation and to attain stability. The amplitude of the video signal wave 45 thereafter is increased at a uniform rate for the remainder of each beam trace and retrace of the luminescent screen. The purpose of such an amplitude variation is to compensate for the variation in the intensity of the invisible radiation reaching the indexing element structure 19$a$. For example, the intensity of the invisible radiation reaching the indexing structure 19$a$ from the center of the screen is greater than that reaching the structure from one side of the screen.

Upon completion of each trace and retrace deflection of the electron beam, the beam is blanked by one of the blanking pulses 48$a$ and the deflection current is reversed in the deflection yoke 17 so as to cause the beam to be deflected in the other direction. The beam remains blanked until such time as it reaches a position near the center of the screen 12. At such time, the beam is unblanked, the frequency divider 35 is triggered into operation, the gating and shading amplifier 43 begins the production of another pulse of the modulating signal 46$a$, the shading modulator produces another cycle of the video signal wave 45, and the previously described cycle of operation is repeated.

In accordance with another feature of the invention, the video signal wave 45 which is applied to the intensity control grid 29 of the color kinescope 11 also is impressed upon a gain-controlling circuit of the phototube multiplier 33 so as to maintain a substantially constant amplitude and wave shape of the 0.6 mc. sinusoidal wave produced at terminal 34. The phototube multiplier receives light which varies in intensity substantially in accordance with the amplitude modulation of the video signal 45. Without the gain control feature, the 0.6 mc. sinusoidal wave developed at the terminal 34 would have an amplitude and wave shape which vary substantially in correspondence with the amplitude modulation of the video signal 45.

From the foregoing description it is seen that the invisible radiation reaching the indexing element structure 19$a$ has a substantially sinusoidal variation, thereby effecting a corresponding variation in the exposure of this structure. When the structure is further processed into its final form for use in the color image-reproducing system of FIGURE 1, it will have a density variation which is substantially sinusoidal in character. By reason of the employment of such compensating apparatus as the gamma amplifier 41 and the shading modulator 42 under the control of the modulating signal 44$a$ the density variation of the indexing element 19 may be of such a character that a substantially constant amplitude sinusoidal indexing signal may be derived from the sensing device 21 of FIGURE 1 regardless of the particular position of the electron beam on the luminescent screen 12. Also, the frequency of such an indexing signal may be made to have any desired relationship to the rate at which the electron beam traverses the screen 12. In the particular example chosen for illustration in the foregoing description, the indexing signal will have a frequency which is ⅓ of the rate at which the beam traverses the groups of color phosphor strips 13.

In order to fabricate the type of indexing element shown in FIGURE 3$a$, a video signal wave comprising an amplitude modulated square wave at 0.2 mc. frequency is used instead of the 0.2 mc. sinusoidal wave described with reference to FIGURE 5.

The particular circuits which have been used in one embodiment of the invention now will be described. Reference first is made to FIGURE 6 depicting typical circuits involved in the pulse generator 38 of FIGURE 5. Reference also is made to the waveforms of FIGURE 7. The pulse generator includes a deflection wave phase splitter 55, a clipper 56 and a multivibrator 57. The sinusoidal deflection current wave 40 appearing at terminals 39 of FIGURE 5 and representing the sinusoidal deflection current applied to the yoke 17 is applied to a double triode electron tube 58 of the amplifier 55. This wave is applied to the two triode sections of the tube 58 in opposite phases so that there are produced at the respective anodes of the tube oppositely phased sinusoidal waves 59 and 61.

The wave 59 is applied to the control grid of an electron tube 62 of the clipper 56 and the wave 61 is applied to the control grid of another electron tube 63 of the clipper. As shown in FIGURE 7, the wave 59 is symmetrical about an A.C. axis 64 and the wave 61 is symmetrical about an A.C. axis 65. The tubes 62 and 63 are biased to cutoff for the waves 59 and 61, respectively, at respective points indicated by the broken lines 66 and 67. These tubes, thus are operated so as to clip the respective waves 59 and 61 so that there is produced at the anode of tube 62 a clipped wave 68 and at the anode of tube 63 a clipped wave 69 which are combined to produce a composite wave 71. The clipping levels for the tubes 62 and 63 are adjusted by respective potentiometers 72 and 73.

The composite clipped wave 71 is impressed upon the multivibrator 57 which includes a double triode electron tube 74 connected in a known manner to function as a monostable multivibrator. The output of the multivibrator appearing at terminal 46 is the control wave 46$a$ previously described with reference to FIGURE 5. This wave is differentiated and appears at terminals 37 as the triggering pulse wave 37$a$. The return time of the multivibrator is adjusted by a potentiometer 75.

With reference particularly to FIGURE 7 the peaks of the sinusoidal waves 59 and 61 correspond in time to the deflection of the electron beam of the cathode ray tube to the extreme edges of the luminescent screen 12 of FIGURE 5. The points at which these waves cross their respective A.C. axes corresponds to a beam position midway between the edges of the screen. Assume for example that the positive peak 76 of the wave 59 corresponds to the beam position at the extreme left hand edge of the screen and that the negative peak 77 of this wave corresponds to the beam position at the extreme right hand edge of the screen. The leading edge 78 of the negative-going pulse of wave 71 occurs in time coinciding with the beam position indicated by the left hand end of the trace component 26a of FIGURE 4. This pulse actuates the multivibrator 57 of FIGURE 6 to produce the leading edge 79 of a positive-going pulse of the control wave 46a. As previously described, this pulse controls the blanking amplifier 47 of FIGURE 5 to produce that portion of the blanking pulse wave 48a which operates to unblank the beam. At the same time, a triggering pulse 37a is generated by differentiation of the leading edge 79 of a positive-going pulse of the control wave 46a to initiate operation of the frequency divider 35 of FIGURE 5 as previously described.

Reference now is made to FIGURE 8 for a description of the gating and shading amplifier 43 and the blanking amplifier 47. The control pulse wave 46a developed at terminal 46 and derived from the multivibrator 57 of FIGURE 6 is applied through an amplitude-adjusting potentiometer 81 and integrating network 82 to a gating amplifier including a double triode electron tube 83. A gating wave 84 (see FIGURE 7) is produced at the right hand anode of this tube. The control pulse wave 46a at terminal 46 also is applied through an amplitude-controlling potentiometer 85 and a sawtooth wave-shaping network 86 to a shading amplifier including a double triode electron tube 87. A substantially sawtooth shading wave 88 (see FIGURE 7) is produced at the right hand anode of this tube.

The gating wave 84 and the shading wave 88 are combined and appear at terminal 44 of the gating and shading amplifier 43 as the modulating signal wave 44a. From FIGURE 7 it is seen that the wave 44a is a composite of the waves 84 and 88. Also, it is seen that the amplitude of the wave 44a begins to increase at a nonlinear rate in time coincidence with the leading edge 79 of a positive-going pulse of the control wave 46a and with the triggering pulse 37a. The non-linear increase in amplitude of the wave 44a up to the point 89 corresponds in time to that represented by the trace component 26a of FIGURE 4. It is seen from FIGURE 7 that the point 89 corresponds in time to that at which the sinusoidal deflection wave 59 crosses its A.C. axis 64 which is the time at which the electron beam is midway of the left and right edges of the screen 12. The increase in amplitude of the wave 44a from the point 89 to the peak point 91 is substantially linear. Again with reference to the sinusoidal wave 59 of FIGURE 7, it is seen that the peak point 91 of the wave 44a corresponds in time to the negative peak 77 of the deflection wave 59 which occurs at the time that the beam is deflected to the extreme right hand edge of the screen.

The multivibrator 57 of FIGURE 6 is adjusted by the potentiometer 75 so that the wave 46a reverses in polarity at the same time that the beam reaches the extreme right hand edge of the screen. This polarity reversal produces the trailing edge 92 of a positive-going pulse of the wave 46a. The impression of the wave 46a upon the blanking amplifier 47 of FIGURE 8 produces a positive-going pulse of the blanking wave 48a at terminal 48 in response to the trailing edge 92 of the wave 46a. This result is produced by applying the control wave 46a to the grid of the left hand portion of a dual triode electron tube 93 of the blanking amplifier 47 and the derivation of the blanking pulse wave 48a from the cathode of the right hand section of this tube, the anode of the left hand section being coupled to the grid of the right hand section.

Thus, the electron beam of the color kinescope 11 of FIGURE 5 is blanked when the beam reaches the right hand edge of the screen and it remains blanked until the multivibrator 57 of FIGURE 6 again is triggered by the leading edge 94 of the next succeeding negative-going pulse of the wave 71 to produce the leading edge 95 of the next succeeding positive-going pulse of the control wave 46a. As previously described, this results in the unblanking of the electron beam, the triggering of the frequency divider 35 and the generation by the gating and shading amplifier 43 of another cycle of the modulating wave 44a. Taking the sinusoidal wave 59 again as representative of the wave applied to the deflection yoke 17, it is to be noted that the current through the yoke reverses, going from a peak negative value to a peak positive value. This produces the right-to-left beam retrace 27 (FIGURE 4). The control of the beam by the blanking pulse wave 48a and by the video signal wave 45 is the same as that previously described with reference to the preceding left-to-right beam trace 26.

The particular apparatus used as the frequency divider 35 of FIGURE 5 is shown in FIGURE 9. This apparatus comprises a polarity splitter 96, one input of which is connected to terminal 34 (FIGURE 5) to receive the 0.6 mc. sinusoidal wave from the phototube multiplier 33. The polarity splitter includes a double triode electron tube 97 the left hand section of which produces respectively at its anode and cathode opposite phases of the 0.6 mc. wave. A balance-adjusting potentiometer 98 enables the achievement of substantially equal amplitudes of the oppositely phased waves. These oppositely phased waves are impressed by coupling capacitors 99 and 101 respectively upon one input of a modulator 102. The modulator includes two pentode electron tubes 103 and 104, the respective No. 1 grids of which receive the oppositely phased 0.6 mc. waves.

The right hand section of the tube 97 of the polarity splitter 96 receives at its control grid a sinusoidal wave having a frequency of 0.4 mc., the source of which will be disclosed presently. Oppositely phase 0.4 mc. waves are developed respectively at the anode and cathode to the right hand section of tube 97. The amplitudes of these waves are made substantially equal by proper setting of a balance-adjusting potentiometer 105. These waves are impressed by coupling capacitors 106 and 107 upon the No. 3 grids of the modulator tubes 103 and 104. Operating bias for the modulator tubes is provided by proper adjustment of at potentiometer 108. In the common anode circuit of the tubes 103 and 104 the modulation products of the 0.6 mc. and the 0.4 mc. sinusoidal waves are developed. These modulation products, which include a 0.2 mc. sinusoidal wave, are impressed upon a filter 109 to segregate the 0.2 mc. wave for impression upon terminal 36 of the frequency divider.

The 0.2 mc. sinusoidal wave developed at terminal 36 is impressed by a coupling capacitor 111 upon a second polarity splitter 112. This device includes a double triode electron tube 113, the control grid of the left hand section of which has impressed thereon the 0.2 mc. wave. The control grid of the right hand portion of the tube 113 is operated at a fixed potential and the cathodes of the two tube sections are coupled together by means of a resistor 114. By means of this circuit arrangement opposite polarities of the 0.2 mc. sinusoidal wave are developed at the respective anodes of the tube 113. These waves are made to have substantially equal amplitudes by proper adjustment of a balancing potentiometer 115.

The oppositely poled 0.2 mc. sinusoidal waves are impressed respectively by coupling capacitors 116 and 117 upon a known type of frequency doubler 118. The frequency doubler includes two pentode electron tubes 119 and 121, the respective No. 1 grids of which receive the oppositely poled 0.2 mc. waves. By the operation of the frequency doubler there is produced at the common anode circuit of the tubes 119 and 121 a sinusoidal wave having a frequency of 0.4 mc. Bias of the frequency doubler tubes is adjusted by a potentiometer 122. Proper balance between the two tubes is controlled by a potentiometer 123. The frequency doubler output amplitude is controlled by a potentiometer 124.

The 0.4 mc. sinusoidal wave produced by the frequency doubler 118 is impressed by a coupling capacitor 125 upon the control grid of the right hand section of the tube 97 of the polarity splitter 96. As previously described, opposite polarities of the 0.4 mc. wave derived from the polarity splitter 96 are impressed upon the modulator 102.

The frequency divider 35 also includes a triggering stage 126 which includes a pentode electron tube 127. The No. 1 grid of this tube is connected to terminal 37 to receive the triggering pulses 37*a* derived from the multivibrator 57 of FIGURE 5. The anode of the tube 127 is connected to the anodes of the frequency doubler tubes 119 and 121 to so control the output of the frequency doubler that, after a period of operation during each beam trace 26 and retrace 27 of FIGURE 4, it becomes inoperative and is only rendered operative again by one of the triggering pulses 37*a* impressed upon the triggering tube 127.

The frequency divider operates to change the 0.6 mc. sinusoidal wave derived from the phototube multiplier 33 to a 0.2 mc. sinusoidal wave at terminal 36 by heterodyning the 0.6 mc. wave with a 0.4 mc. wave which is derived from the original 0.6 mc. wave. During periods when the beam of the kinescope is blanked the phototube multiplier receives no light and produces no 0.6 mc. wave. Hence, the frequency divider becomes inactive. The frequency divider operates as a regenerative device and after a period of inactivity requires a short time in which to reach a stable operating state. This is the reason for triggering the frequency divider into preliminary operation just before the electron beam reaches the midpoint of the luminescent screen during each beam trace and retrace. The 0.2 mc. sinusoidal wave produced by the frequency divider is developed at its output terminal 36 which, as previously described, is connected to the other apparatus by which it is processed for application to the electron gun of the color kinescope 11.

FIGURE 10 shows the particular apparatus comprising the remaining elements of the system of FIGURE 5. This apparatus includes the gamma amplifier 41, the shading modulator 42, the phototube multiplier 33 and the color kinescope 11. The gamma amplifier 41 includes a pentode electron tube 128, the No. 1 grid of which is connected to terminal 36 to receive the 0.2 mc. sinusoidal wave derived from the filter 109 of frequency divider 35 of FIGURE 9. As previously stated, the gamma amplifier is of a known type and functions conventionally to modify the form of the 0.2 mc. wave in a manner to compensate for the non-linear signal-to-light transfer characteristic of the color kinescope 11. Bias of the gamma amplifier tube 128 is adjusted by a potentiometer 129.

The output of the gamma amplifier 41 is coupled by a capacitor 131 to the input of the shading modulator 42. This apparatus includes two pentode electron tubes 132 and 133. The gamma-amplified 0.2 mc. sinusoidal wave is impressed upon the No. 3 grid of the tube 132 and the modulating signal wave 44*a* developed at terminal 44 is impressed upon the No. 1 grid of this tube. The tube 132 thus acts as a modulator so as to produce at its anode the amplitude-modulated video signal wave 45 which is impressed upon the No. 1 grid of the tube 133. This latter tube acts as a video signal amplifier so that an amplified version of the video signal wave 45 is developed in its anode circuit. A potentiometer 134 associated with the tube 132 serves as a pedestal adjustment for the modulator 42. A potentiometer 135 associated with the tube 133 serves as a video signal contrast control. The amplified video signal wave 45 is impressed by a coupling capacitor 136 upon the control grid 29 of the color kinescope 11.

The same video signal is impressed by a coupling capacitor 137 upon the phototube multiplier 33 to control its gain so that the 0.6 mc. sinusoidal wave developed at terminal 34 is substantially free from the amplitude modulation of the video signal wave 45. The phototube multiplier comprises a radiation receiving photocathode 138 serving as an input electrode, an electron collector anode 139 serving as an output electrode, and a plurality of electron multiplying dynodes 140. The operating potentials for the dynodes are derived in the usual manner from a voltage divider 141 connected across a unidirectional power supply 142. The electron multiplication or gain of the phototube multiplier is a function of the operating potentials applied to successive ones of dynodes 140. In order to dynamically vary the gain of the phototube multiplier so as to remove the video signal modulation from its output, the potential on one or more of the dynodes, such as the dynode 140*a* for example, is varied under the control of the video signal wave 45 derived from the shading modulator 42. Instead of being connected directly to the voltage divider 141, the dynode 140*a* is connected through a resistor 143 which in turn is connected to a variable tap on the voltage divider. The video signal wave 45 derived from the shading modulator 42 is impressed upon the resistor 143 to effect the desired gain control of the phototube multiplier.

A bandpass filter 144 connected between the phototube multiplier anode 139 and terminal 34 serves to insure that only a sinusoidal wave of 0.6 mc. is developed at terminal 34.

A brightness control circuit 145 is connected to the control grid 29 of the color kinescope 11 to suitably adjust the bias of the control grid in order to control the brightness of the light output from the luminescent screen 12 in a known manner. The cathode 28 of the color kinescope 11 is connected to terminal 48 to receive the blanking signal as previously described.

It is to be understood that the present invention is not necessarily limited to the particular apparatus shown and described herein for the purpose of disclosing an illustrative embodiment of the invention. The indexing element need not have the form and location such as illustrated by the indexing element 19 of FIGURE 1. The invention is susceptible of use in fabricating an indexing element in the form of a plurality of areas such as strips of indexing information-producing material aligned with the color phosphor light-producing strips and located on the back side of the luminescent screen in an arrangement such as shown in Patent 2,771,503 granted November 20, 1956, to J. W. Schwartz. In such a case, the indexing element is fabricated by first depositing a continuous layer of the desired material on the side of the screen facing the electron gun substantially in the same manner as the layer 15 of invisible radiation-producing material is deposited on the side of the metallic layer 14 opposite to the color phosphor strips 13 in FIGURE 2. The electron beam is then controlled substantially in the manner set forth in the previously described illustrative embodiment of the invention, such as by modulation of its intensity so that its impingement upon the layer 15 selectively modifies the invisible radiation capability of the material according to a desired pattern, such as illustrated in FIGURE 3 or FIGURE 3*a* so that, in normal operation of the image-reproducing tube, the desired indexing information is generated as disclosed in above-mentioned Schwartz Patent 2,771,503.

Also the control of the electron beam in response to signals indicative of successive instantaneous positions of the beam of the luminescent screen may be effected by means other than those modulating its intensity. For example, the horizontal deflection of the beam may be modified at a frequency higher than the horizontal deflection frequency so that the beam is momentarily retarded in its traverse of selected ones of the color phosphor strips so as to excite selected phosphor strips to produce light having a particular color. Such a control of a beam in a device of the character described is shown in Patent 2,989,582 granted June 20, 1961, to V. K. Zworykin et al. As another alternative of electron beam control within the purview of this invention, a combination of intensity modulation and deflection rate variation also may be used.

What is claimed is:

1. Apparatus for fabricating an indexing element for a color image-reproducing device having a screen comprising a plurality of groups of elements respectively representative of different image colors when energized, and said indexing element having such a given characteristic and a given location relative to said screen as to produce indexing information indicative of the location on said screen of energized ones of said screen elements in response to energy derived from said screen in normal operation of said image-reproducing device, said indexing element to be fabricated by said apparatus from a structure having the property of being modified by energy derived from said screen so as to exhibit said given characteristic, said apparatus comprising: means for selectively energizing said screen elements; means responsive to energy derived from corresponding ones of said screen elements to develop signals indicative of the locations of said corresponding screen elements; means responsive to said signals to control the energization of said screen elements as a function of said corresponding screen element locations in a manner to produce energy varying in correspondence with said corresponding screen element locations; and means for positioning said structure so as to receive said energy derived from said screen, whereby to produce said indexing element.

2. Apparatus for fabricating an indexing element for a color image-reproducing device having a screen comprising a plurality of groups of elements respectively representative of different image colors when energized by the impingement of an electron beam, a continuous layer of material on the back of said screen and capable of producing a given radiation uniformly over its surface in response to a given beam intensity, and said indexing element being a transparency of cyclically varying transmission capability for said given radiation and having such a given location relative to said screen as to produce indexing information indicative of successive instantaneous positions of said electron beam on said screen in response to energy derived from said beam in normal operation of said image-reproducing device, said indexing element to be fabricated by said apparatus from an unexposed photographic element sensitive to said given radiation, said apparatus comprising: means for deflecting said electron beam over said screen elements to energize said screen elements selectively; means responsive to energy derived from corresponding ones of said screen elements to develop signals indicative of successive instantaneous positions of said beam on said screen; means responsive to said signals to control said beam as a function of said instantaneous beam positions in a manner to produce said given radiation varying in intensity in correspondence with said instantaneous beam positions; and means for positioning said unexposed photographic element so as to receive said given radiation, whereby to produce said indexing element.

3. Apparatus for fabricating an indexing element for a color image-reproducing device having a screen comprising a plurality of groups of elements respectively representative of different image colors when energized by the impingement of an electron beam, a continuous layer of material on the back of said screen and capable of producing a given radiation uniformly over its surface in response to a given beam intensity, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from said layer of radiation-producing material susceptible of such modification by an intensity modulated electron beam so as to produce said indexing information during normal operation of said tube, said apparatus comprising: means for deflecting said electron beam over said screen elements to energize said screen elements selectively; means responsive to energy derived from corresponding ones of said screen elements to develop signals indicative of successive instantaneous positions of said beam on said screen; and means responsive to said signals to modulate the intensity of said beam as a function of said instantaneous beam positions, whereby to produce said indexing element.

4. Apparatus for fabricating an indexing element for a color image-reproducing cathode ray tube, said tube having a luminescent screen comprising a plurality of groups of phosphor elements respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phosphor elements to excite said phosphor elements successively; means responsive to energy derived from substantially only those phosphor elements capable of producing one particular color to develop signals indicative of successive instantaneous positions of said beam on said screen; means responsive to said signals to produce a beam-controlling wave having a given relationship to said signals; means controlled by said beam-controlling wave to control said beam as a function of said instantaneous beam positions in a manner to produce energy varying in correspondence with said instantaneous beam positions; and means for positioning said structure so as to receive said energy derived from said beam, whereby to produce said indexing element.

5. Apparatus for fabricating an indexing element for a color image-reproducing cathode ray tube, said tube having a luminescent screen comprising a plurality of groups of phosphor strips respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phosphor strips to excite said strips successively; means responsive to light of substantially only one particular color to develop signals indicative of successive instantaneous positions of said beam on said screen; means including a frequency divider responsive to said signals to produce a beam-controlling wave having a frequency equal to a given fraction of the frequency of said signals; means controlled by said beam-controlling wave to control said beam as a function of said instantaneous beam positions in a manner to produce energy varying in correspondence with said instantaneous beam positions; and means for positioning said structure so as to receive said energy derived from said beam, whereby to produce said indexing element.

6. Apparatus for fabricating an indexing element for a color image-reproducing cathode ray tube, said tube having a luminescent screen comprising a plurality of groups of phosphor strips respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phosphor strips to excite said strips successively; means responsive to light of substantially only one particular color to develop signals indicative of successive instantaneous positions of said beam on said screen; means including a regenerative frequency divider responsive to said signals to produce a modulating wave having a frequency equal to a given fraction of the frequency of said signals; means responsive to a signal indicative of a particular beam position to control the operation of said regenerative frequency divider; means controlled by said modulating wave to modulate the intensity of said beam as a function of said instantaneous beam positions in a manner to produce energy varying in correspondence with said instantaneous beam positions; and means for positioning said structure so as to receive said energy derived from said beam, whereby to produce said indexing element.

7. Apparatus for fabricating an indexing element for a color image-reproducing cathode ray tube, said tube having a luminescent screen comprising a plurality of groups of phosphor strips respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phosphor strips to excite said strips successively; means responsive to light of substantially only one particular color to develop signals indicative of successive instantaneous positions of said beam on said screen; means responsive to said signals to produce a modulating wave having a frequency equal to a given fraction of the frequency of said signals; means controlled by said modulating wave to modulate the intensity of said beam as a function of said instantaneous beam positions in a manner to produce energy varying in correspondence with said instantaneous beam positions, said beam intensity-modulating means including a gamma corrector to modify the waveform of said modulating wave to compensate for the inherent non-linear signal-to-light transfer characteristic of said tube, and means for positioning said structure so as to receive said energy derived from said beam, whereby to produce said indexing element.

8. Apparatus for fabricating an indexing element for a color image-reproducing cathode ray tube, said tube having a luminescent screen comprising a plurality of groups of phosphor strips respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phosphor strips to excite said strips successively, said deflection being of a character to trace a series of lines spaced longitudinally of said strips with alternate lines being traced in opposite directions; means responsive to light of substantially only one particular color to develop signals indicative of successive instantaneous positions of said beam on said screen; means including a frequency divider responsive to said signals to produce a modulating wave having a frequency equal to a given fraction of the frequency of said signals; means controlled by said modulating wave to modulate the intensity of said beam as a function of said instantaneous beam positions in a manner to produce energy varying in correspondence with said instantaneous beam positions; and means for positioning said structure so as to receive said energy derived from said beam, whereby to produce said indexing element.

9. Apparatus for fabricating an indexing element for a color image-reproducing cathode ray tube, said tube having a luminescent screen comprising a plurality of groups of phosphor strips respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phosphor strips to excite said strips successively, said deflection being of a character to trace a series of lines spaced longitudinally of said strips with alternate lines being traced in opposite directions; means responsive to light of substantially only one particular color to develop signals indicative of successive instantaneous positions of said beam on said screen; means including a frequency divider responsive to said signals to produce a modulating wave having a frequency equal to a given fraction of the frequency of said signals; means for blanking said beam during at least a portion of the first half of each of said lines; mean controlled by said modulating wave to modulate the intensity of said beam as a function of said instantaneous beam positions in a manner to produce energy varying in correspondence with said instantaneous beam positions; and means for positioning said structure so as to receive said energy derived from said beam, whereby to produce said indexing element.

10. Apparatus for fabricating an indexing element for a color image-reproducing cathode ray tube, said tube having a luminescent screen comprising a plurality of groups of phosphor strips respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phosphor strips to excite said strips successively, said deflection being of a character to trace a series of lines spaced longitudinally of said strips with alternate lines being traced in opposite directions; means responsive to light of substantially only one particular color to develop signals indicative of successive instantaneous positions of said beam on said screen; means including a frequency divider responsive to said signals to produce a modulating wave having a frequency equal to a given fraction of the frequency of said signals;

means for blanking said beam during at least a portion of the first half of each of said lines; means responsive to said deflecting means to control said beam-blanking means; means controlled by said modulating wave to modulate the intensity of said beam as a function of said instantaneous beam positions in a manner to produce energy varying in correspondence with said instantaneous beam positions; and means for positioning said structure so as to receive said energy derived from said beam, whereby to produce said indexing element.

11. Apparatus for fabricating an indexing element for a color image-reproducing cathode ray tube, said tube having a luminescent screen comprising a plurality of groups of phosphor strips respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phophor strips to excite said strips successively, said deflection being of a character to trace a series of lines spaced longitudinally of said strips with alternate lines being traced in opposite directions; means responsive to light of substantially only one particular color to develop signals indicative of successive instantaneous positions of said beam on said screen; means including a frequency divider responsive to said signals to produce a modulating wave having a frequency equal to a given fraction of the frequency of said signals; means for rendering said frequency divider operative in the same phase relationship to said signals during the first half of each of said lines; means controlled by said modulating wave to modulate the intensity of said beam as a function of said instantaneous beam positions in a manner to produce energy varying in correspondence with said instantaneous beam positions; and means for positioning said structure so as to receive said energy derived from said beam, whereby to produce said indexing element.

12. An apparatus for fabricating an indexing element for a color image-reproducing cathode ray tube, said tube having a luminescent screen comprising a plurality of groups of phosphor strips respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phosphor strips to excite said strips successively, said deflection being of a character to trace a series of lines spaced longitudinally of said strips with alternate lines being traced in opposite directions; means responsive to light of substantially only one particular color to develop signals indicative of successive instantaneous positions of said beam on said screen; means including a frequency divider responsive to said signals to produce a modulating wave having a frequency equal to a given fraction of the frequency of said signals; means for rendering said frequency divider operative in the same phase relationship to said signals during the first half of each of said lines; means responsive to said deflecting means for producing triggering pulses and for applying them to said means for rendering said frequency divider operative; means controlled by said modulating wave to modulate the intensity of said beam as a function of said instantaneous beam positions in a manner to produce energy varying in correspondence with said instantaneous beam positions; and means for positioning said structure so as to receive said energy derived from said beam, whereby to produce said indexing element.

13. Apparatus for fabricating an indexing element for a color image-reproducing cathode ray tube, said tube having a luminescent screen comprising a plurality of groups of phosphor strips respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phosphor strips to excite said strips successively, said deflection being of a character to trace a series of lines spaced longitudinally of said strips with alternate lines being traced in opposite directions at substantially the same rate; means responsive to light of substantially only one particular color to develop signals indicative of successive instantaneous positions of said beam on said screen; means including a frequency divider responsive to said signals to produce a modulating wave having a frequency equal to a given fraction of the frequency of said signals; means controlled by said modulating wave to modulate the intensity of said beam as a function of said instantaneous beam positions in a manner to produce energy varying in correspondence with said instantaneous beam positions, said modulating wave producing means including a shading modulator which when rendered operative gradually increases the amplitude of said modulating wave to maximum value; control means to render said shading modulator operative at a given point during the first half of each of said lines; and means for positioning said structure so as to receive said energy derived from said beam, whereby to produce said indexing element.

14. Apparatus for fabricating an indexing element for a color image-reproducing cathode ray tube, said tube having a luminescent screen comprising a plurality of groups of phophor strips respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phosphor strips to excite said strips successively, said deflection being of a character to trace a series of lines spaced longitudinally of said strips with alternate lines being traced in opposite directions at substantially the same rate; means responsive to light of substantially only particular color to develop signals indicative of successive instantaneous positions of said beam on said screen; means including a frequency divider responsive to said signals to produce a modulating wave having a frequency equal to a given fraction of the frequency of said signals; means controlled by said modulating wave to modulate the intensity of said beam as a function of said instantaneous beam positions in a manner to produce energy varying in correspondence with said instantaneous beam positions, said modulating wave-producing means including a shading modulator which when rendered operative gradually increases the amplitude of said modulating wave to maximum value; control means to render said shading modulator operative at a given point during the first half of each of said lines, said control means including a gating amplifier to initiate operation of said shading modulator; and means for positioning said structure so as to receive said energy derived from said beam, whereby to produce said indexing element.

15. Apparatus for fabricating an indexing element for a color image-reproducing cathode ray tube, said tube having a luminescent screen comprising a plurality of groups of phosphor strips respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phosphor strips to excite said strips successively, said deflection being of a character to trace a series of lines spaced longitudinally of said strips with alternate lines being traced in opposite directions at substantially the same rate; means responsive to light of substantially only one particular color to develop signals indicative of successive instantaneous positions of said beam on said screen; means including a frequency divider responsive to said signals to produce a modulating wave having a frequency equal to a given fraction of the frequency of said signals; means controlled by said modulating wave to modulate the intensity of said beam as a function of said instantaneous beam positions in a manner to produce energy varying in correspondence with said instantaneous beam positions, said modulating wave-producing means including a shading modulator which when rendered operative gradually increases the amplitude of said modulating wave to maximum value; control means to render said shading modulator operative at a given point during the first half of each of said lines, said control means including a gating amplifier to initiate operation of said shading modulator and also a shading amplifier to effect said gradual amplitude increase of said modulating wave; and means for positioning said structure so as to receive said energy derived from said beam, whereby to produce said indexing element.

16. Apparatus for fabricating an indexing element for a color image-reproducing cathode ray tube, said tube having a luminescent screen comprising a plurality of groups of phosphor strips respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phosphor strips to excite said strips successively, said deflection being of a character to trace a series of lines spaced longitudinally of said strips with alternate lines being traced in opposite directions at substantially the same rate; means responsive to light of substantaneously only one particular color to develop signals indicative of successive instantaneous positions of said beam on said screen; means including a frequency divider responsive to said signals to produce a modulating wave having a frequency equal to a given fraction of the frequency of said signals; means controlled by said modulating wave to modulate the intensity of said beam as a function of said instantaneous beam positions in a manner to produce energy varying in correspondence with said instantaneous beam positions, said modulating wave-producing means including a shading modulator which when rendered operative gradually increases the amplitude of said modulating wave to maximum value; control means to render said shading modulator operative at a given point during the first half of each of said lines, said control means including a gating amplifier to initiate operation of said shading modulator and also a shading amplifier to effect said gradual amplitude increase of said modulating wave; means responsive to said deflecting means for controlling the operation of said gating amplifier and said shading amplifier; and means for positioning said structure so as to receive said energy derived from said beam, whereby to produce said indexing element.

17. Apparatus for fabricating an indexing element for a color image-reproducing cathode ray tube, said tube having a luminescent screen comprising a plurality of groups of phosphor strips respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phosphor strips; means responsive to light of substantially only one particular color to develop signal indicative of successive instantaneous positions of said beam on said screen; means responsive to said signals to produce a beam-controlling wave having a given relationship to said signals; means responsive to said beam-controlling wave to control said beam as a function of said instantaneous beam positions in a manner to produce energy varying in correspondence with said instantaneous beam positions; means responsive to said beam-controlling wave to control said signal-developing means in a manner to maintain a substantially constant level and shape of said indexing signals; and means for positioning said structure so as to receive said energy derived from said beam, whereby to produce said indexing element.

18. Apparatus for fabricating an indexing element for a color image-reproducing cathode ray tube, said tube having a luminescent screen comprising a plurality of groups of phosphor strips respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phosphor strips; means responsive to light of substantially only one particular color to develop signals indicative of successive instantaneous positions of said beam on said screen; means responsive to said signals to produce a beam-controlling wave having a given relationship to said signals; means responsive to said beam-controlling wave to control said beam as a function of said instantaneous beam positions in a manner to produce energy varying in correspondence with said instantaneous beam positions; means responsive to said beam-controlling wave to control said signal-developing means in a manner to maintain a substantially constant shape of said indexing signals; and means for positioning said structure so as to receive said energy derived from said beam, whereby to produce said indexing element.

19. Apparatus for fabricating an indexing element for a color image-reproducing cathode ray tube, said tube having a luminescent screen comprising a plurality of groups of phosphor strips respectively capable of producing light of different colors when excited by the impingement of an electron beam, and said indexing element having such a given characteristic and a given location relative to said screen as to produce indexing information indicative of successive instantaneous positions of said electron beam on said screen in response to energy derived from said beam in normal operation of said tube, said indexing element to be fabricated by said apparatus from a structure having the property of being modified by energy derived from said beam so as to exhibit said given characteristic, said apparatus comprising: means for deflecting said electron beam transversely of said phosphor strips; means responsive to light of substantially only one particular color to develop signals indicative of successive instantaneous positions of said beam on said screen; means responsive to said signals to produce a beam-controlling wave having a periodically varying amplitude; means responsive to said beam-controlling wave to control said beam as a function of said instantaneous beam positions in a manner to produce energy varying in correspondence with said instantaneous beam positions; means responsive to said beam-controlling wave to control said signal-developing means in a manner to maintain a substantially constant level of said indexing signals; and means for positioning said structure so as to receive said energy derived from said beam, whereby to produce said indexing element.

References Cited by the Examiner

UNITED STATES PATENTS

| | | | |
|---|---|---|---|
| 2,790,107 | 4/57 | Bradley | 315—10 |
| 2,945,087 | 7/60 | Graham et al. | 178—5.4 |

DAVID G. REDINBAUGH, *Primary Examiner.*

ROBERT SEGAL, *Examiner.*